United States Patent
Smith

[15] 3,695,114
[45] Oct. 3, 1972

[54] UNIVERSALLY TILTABLE STATIC BALANCE TESTING APPARATUS WITH ADJUSTABLE WORK GRIPPING MECHANISM

[72] Inventor: Thomas C. Smith, Centerline, Mich.
[73] Assignee: Micro-poise Engineering & Sales Company, Wixom, Mich.
[22] Filed: March 6, 1970
[21] Appl. No.: 17,204

[52] U.S. Cl. .................................................73/485
[51] Int. Cl. ..............................................G01m 1/04
[58] Field of Search.....................73/482–486, 487; 279/2, 110, 119; 144/288 A

[56] References Cited

UNITED STATES PATENTS

| | | | |
|---|---|---|---|
| 2,220,404 | 11/1940 | Hulslander | 73/485 |
| 2,269,137 | 1/1942 | Wikle | 279/2 |
| 1,181,355 | 5/1916 | Stevens | 279/2 |
| 2,682,924 | 7/1954 | Lomazzo et al. | 279/2 |
| 3,152,483 | 10/1964 | Hemmeter | 73/484 |
| 3,352,732 | 11/1967 | Darr | 73/485 X |
| 2,254,588 | 9/1941 | Breth | 279/2 X |

Primary Examiner—Richard C. Queisser
Assistant Examiner—Marvin Smollar
Attorney—Allan J. Murray

[57] ABSTRACT

A workpiece carrier is supported for tilting travel about a substantially vertical axis upon an arcuately spherical universal pivot, which pivot rests upon a seat having a corresponding sphericity. The seat surmounts an annular pedestal situated upon the top surface of a housing. An annular clamp concentrically encircles the pedestal, and has limited, reciprocable, vertical travel thereon. Drive means is provided to urge the clamp in downward travel to a carrier restraint position. A portion of said annular clamp is adapted to engage the carrier in the restraint position to resist tilting travel of the pivot.

Drive means is provided, also, to drive the annular clamp in upward travel to a carrier release position. The release position leaves the pivot free for tilting travel in any direction. A plurality of equally spaced jaws, comprising a chuck, is individually, pivotally mounted upon the carrier to be swung inwardly toward said vertical axis (contracted) to a workpiece load and unload position. Alternatively, the jaws may be swung outwardly from said axis (expanded) to a workpiece gripping position.

Connecting links join said jaws with a spider, which has vertical, reciprocable travel, so that downward travel of the spider expands said chuck jaws, and upward travel contracts said chuck jaws. A spring tends to drive the spider in downward travel (expansion) and a fluid motor opposes said spring to drive the spider in upward travel (contraction). A typical workpiece is a pneumatic tire, with the chuck jaws engaging upon the beads of the tire when the chuck expands. The actual gripping position of the jaws is determined by the bead diameter, and hence the chuck can accept a plurality of such diameters, in random sequence, within the limits of its minimum contraction and maximum expansion. Each connecting link includes at least one universally movable, spherical joint, to afford non-radial movement of the linkage relative to said vertical axis.

14 Claims, 15 Drawing Figures

INVENTOR
THOMAS C. SMITH
BY Allan J. Murray
ATTORNEY

FIG. 4
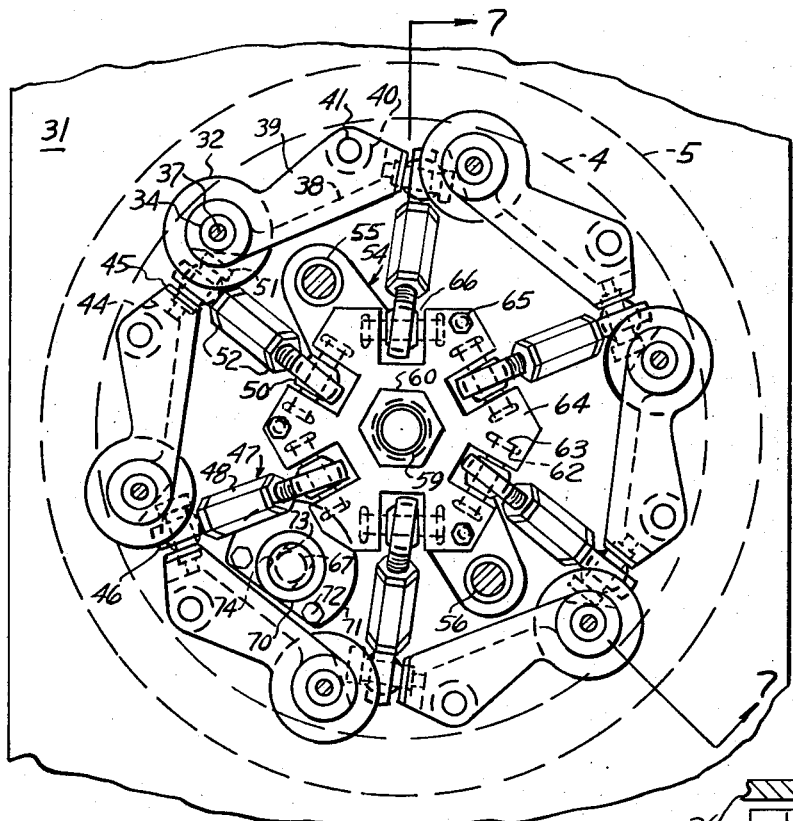
FIG. 11
FIG. 9
FIG. 10
INVENTOR
THOMAS C. SMITH
BY Allan J. Murray
ATTORNEY
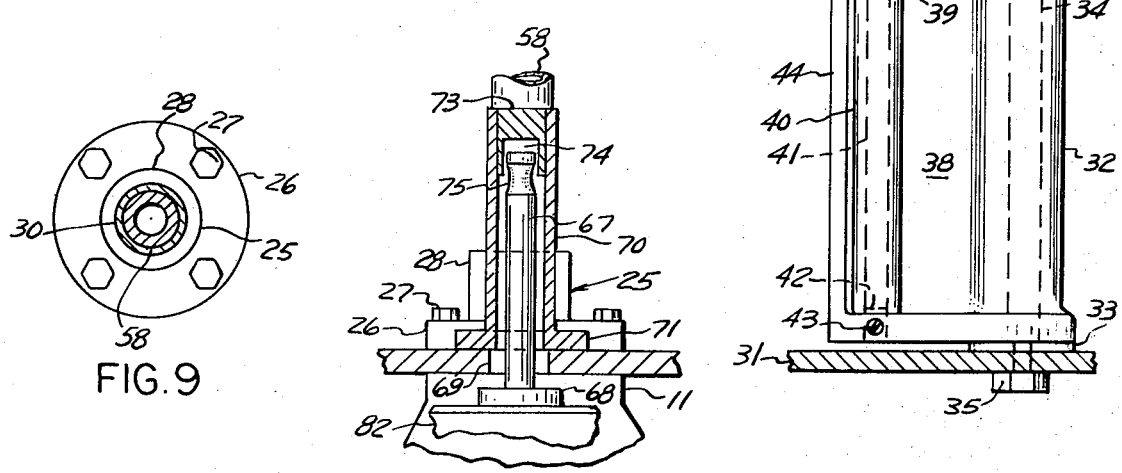

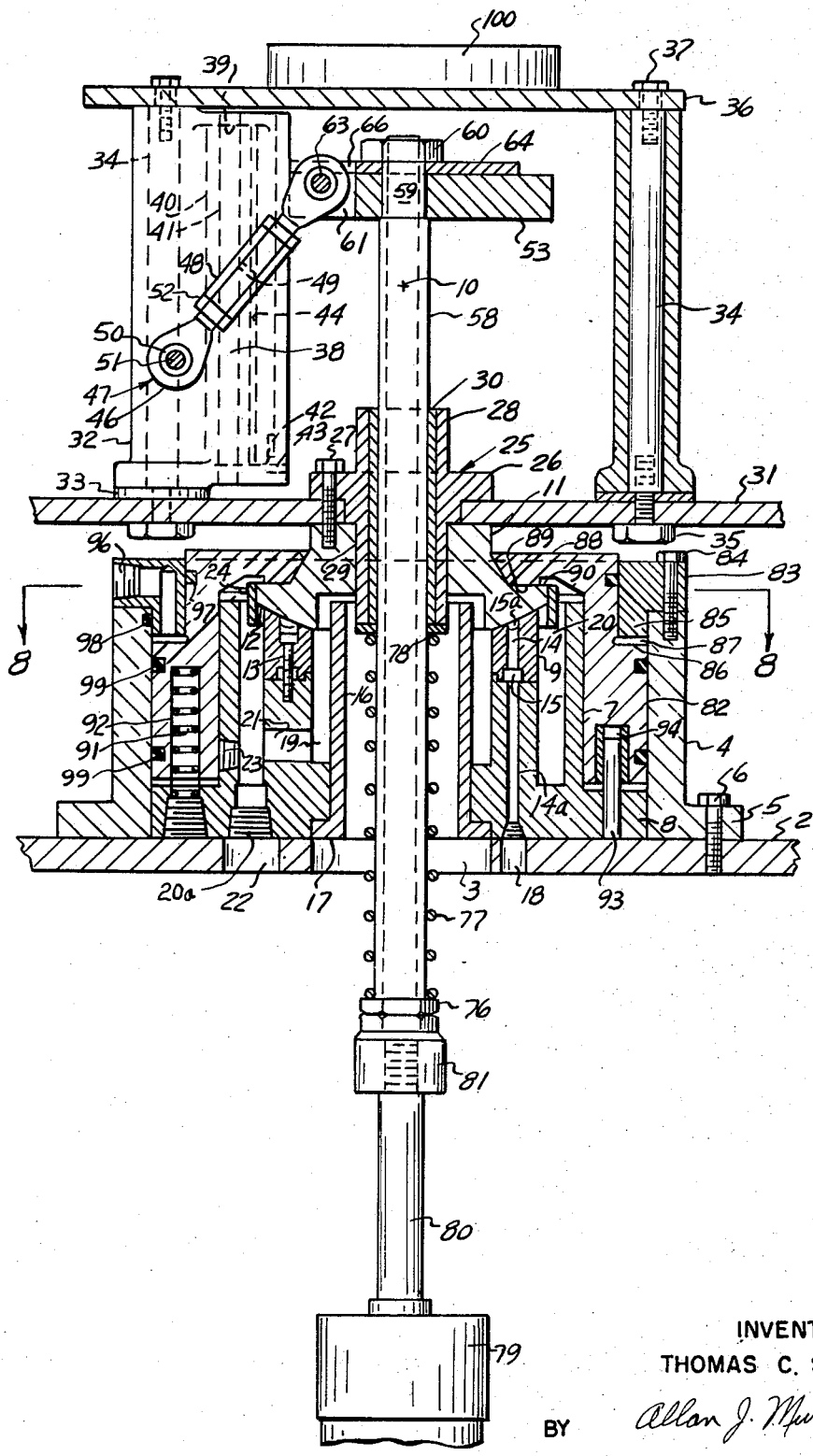

3,695,114

UNIVERSALLY TILTABLE STATIC BALANCE TESTING APPARATUS WITH ADJUSTABLE WORK GRIPPING MECHANISM

RELATED PATENTS

The spherical pivot means of the ensuing disclosure is closely analagous to the disclosure of U.S. Pat. No. 3,181,371 issued to Joseph P. Lannen on May 4, 1965, on a Universal Balance Testing Machine, showing means to lubricate such pivot under pressure. It is thought unnecessary to repeat herein the disclosures of said patent as to a pump, a relief valve, and an oil reservoir incorporated in the lubricating system. A further U.S. Pat. No. 3,445,170, also issued to Joseph P. Lannen, on July 15, 1969, again disclosing the spherical, oil lubricated pivot, but with invention directed toward a form of damping mechanism. Each connecting link includes at least one universally movable, spherical joint, to afford non-radial movement of the linkage relative to said vertical axis.

A damper, as disclosed in U.S. Pat. No. 2,349,288, issued to Joseph P. Lannen on May 23, 1944, may be employed with the present disclosure if desired.

No search has been made prior to the preparation of the present application. However, there is submitted herewith a separate document containing the citations encountered in prosecuting said prior applications, and on one resulting in a U.S. Pat. No. 3,158,032, issued Nov. 24, 1964, in which the chuck jaws were made to expand and contract by a mechanism quite dissimilar from that employed in the present invention.

Invention resides in, and the object of the invention is to provide, the unique combination of a pivot encircled by an annular clamp which is adapted to restrain tilting travel of a carrier upon said pivot when said clamp occupies a carrier restraint position, and to afford tilting of the pivot when the clamp is in a carrier release position, with the further object of providing in said combination, and, also independently thereof, a plurality of predeterminedly spaced jaws having swinging travel about pivot elements, between a workpiece gripping position and a workpiece load and unload position, said swinging travel being responsive to the vertical reciprocable travel of a spider interconnected by links with said jaws.

These various other objects are attained by the construction hereinafter described and illustrated in the accompanying drawings, wherein.

Figure 1:
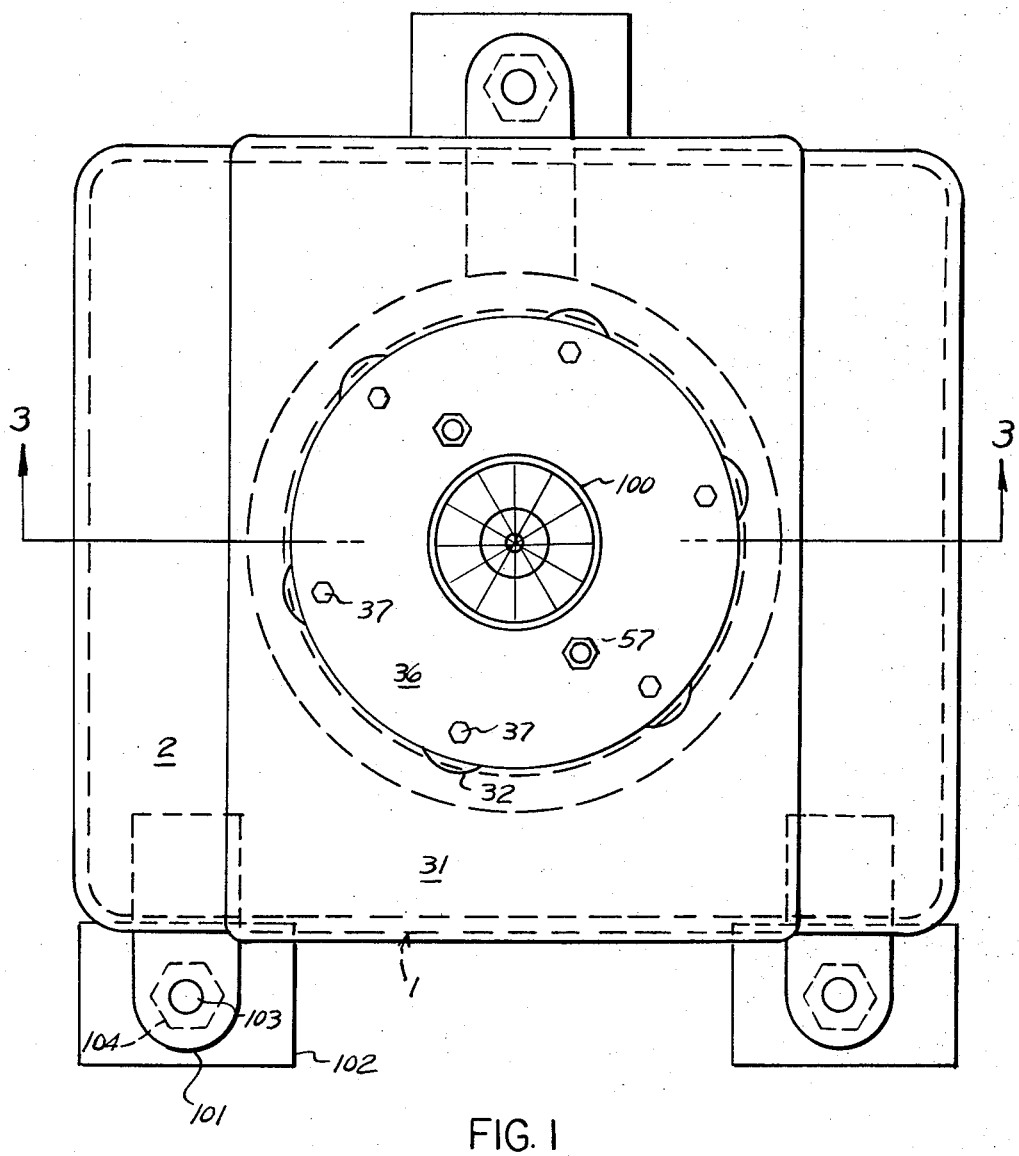
FIG. 1 is a plan view of the construction embodying the invention taken on line 1—1 of FIg. 2.
Figure 2:
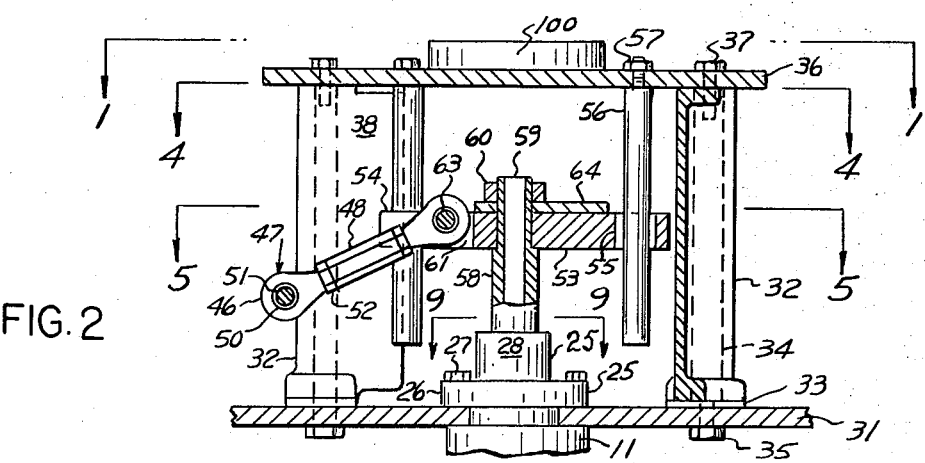
FIG. 2 is a partial, vertical, sectional view of the chuck jaw and a portion of the carrier taken on line 2—2 of FIG. 5 showing a connecting link in a chuck jaw expanded position, and omitting background elements for clarity.
Figure 3:
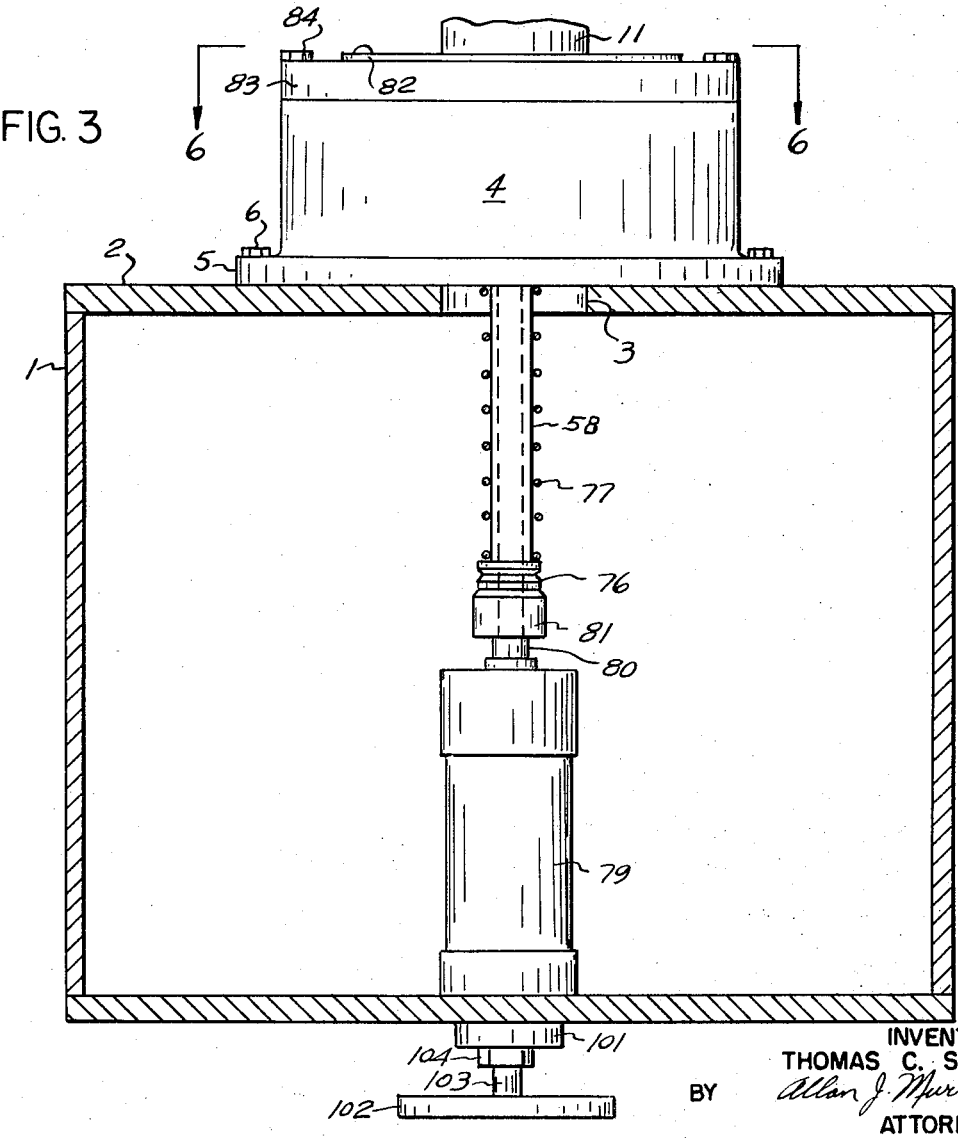

FIG. 3 may be regarded as a downward continuation of FIG. 2, but is taken on line 3—3 of FIG. 1, beneath the chuck assembly, and is a vertical, elevational, sectional view of the base of the machine showing the cylinder and cylinder cap in relief.

FIG. 4 is a horizontal, partial, sectional view taken on line 4—4 of FIG. 2 portraying the chuck jaws in the contracted, work load or unload position, and is drawn on a larger scale than FIG. 1.

Figure 5:
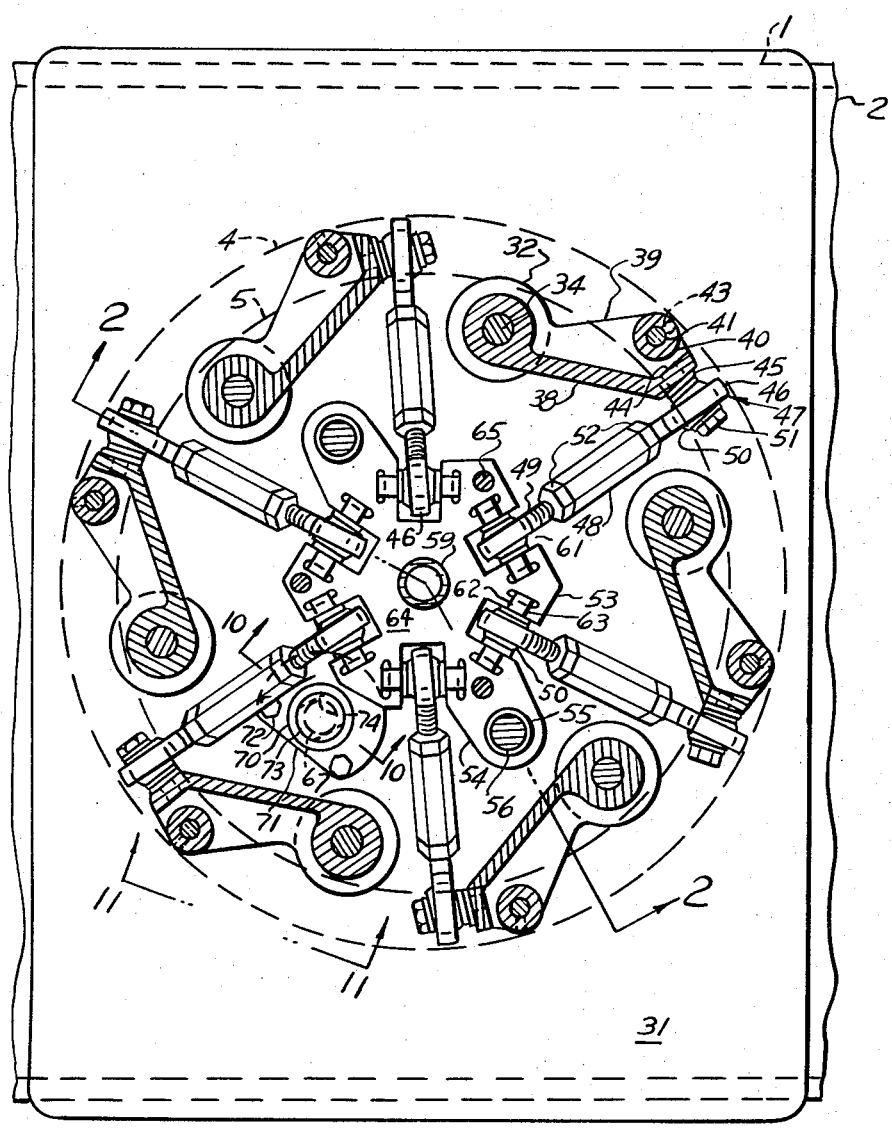

FIG. 5 is a horizontal, partial, sectional view of the chuck taken on line 5—5 of FIG. 2 and shows the chuck jaws in an expanded, work gripping position.

Figure 6:
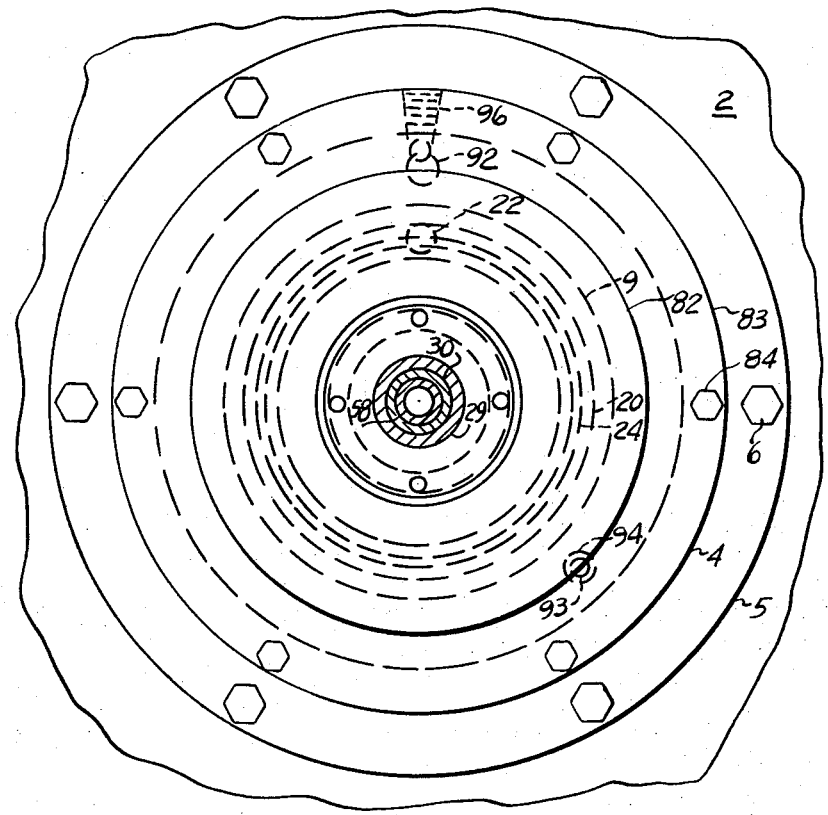

FIG. 6 is a horizontal, partial, sectional view taken on line 6—6 of FIG. 3 showing the carrier with the chuck mechanism removed therefrom.

FIG. 7 is a vertical, elevational, partial sectional view taken on line 7—7 of FIG. 4 showing a connecting link in the chuck jaw retracting position and omitting background elements for clarity; superimposing line 7—7 on FIGS. 6 and 8 facilitates understanding of the central portion of FIG. 7 (below the chuck assembly).

Figure 8:
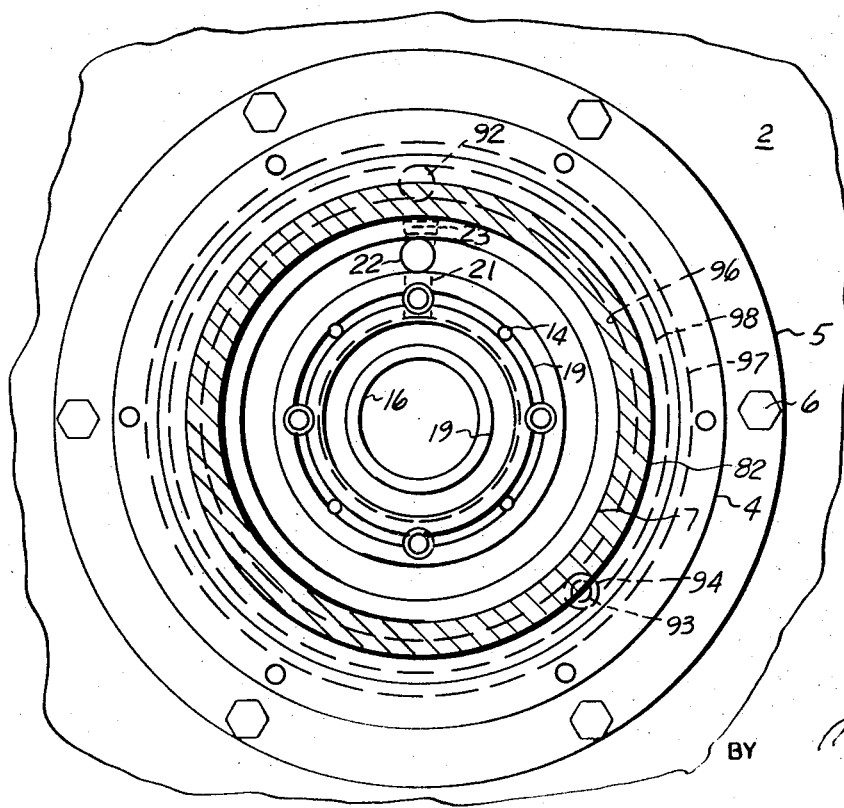

FIG. 8 is a horizontal, partial, sectional view on line 8—8 of FIG. 7 showing the seating member, the clamp (in section) and the cylinder, and omitting the cylinder cap and screws, and the carrier, to more clearly disclose the various oiling apertures in the construction.

FIG. 9 is a horizontal, partial, sectional view taken on line 9—9 of FIG. 2, showing a tubular actuating shaft to drive said spider in its travel, and a guide block for said shaft.

FIG. 10 is a vertical, partial, sectional view, taken on line 10—10 of FIG. 5, of a stop pin to resist rotation of the chuck about said vertical axis.

FIG. 11 is a vertical, partial, sectional view taken on line 11—11 of FIG. 5 to show, in isolation, one of the chuck jaws.

Figure 12:
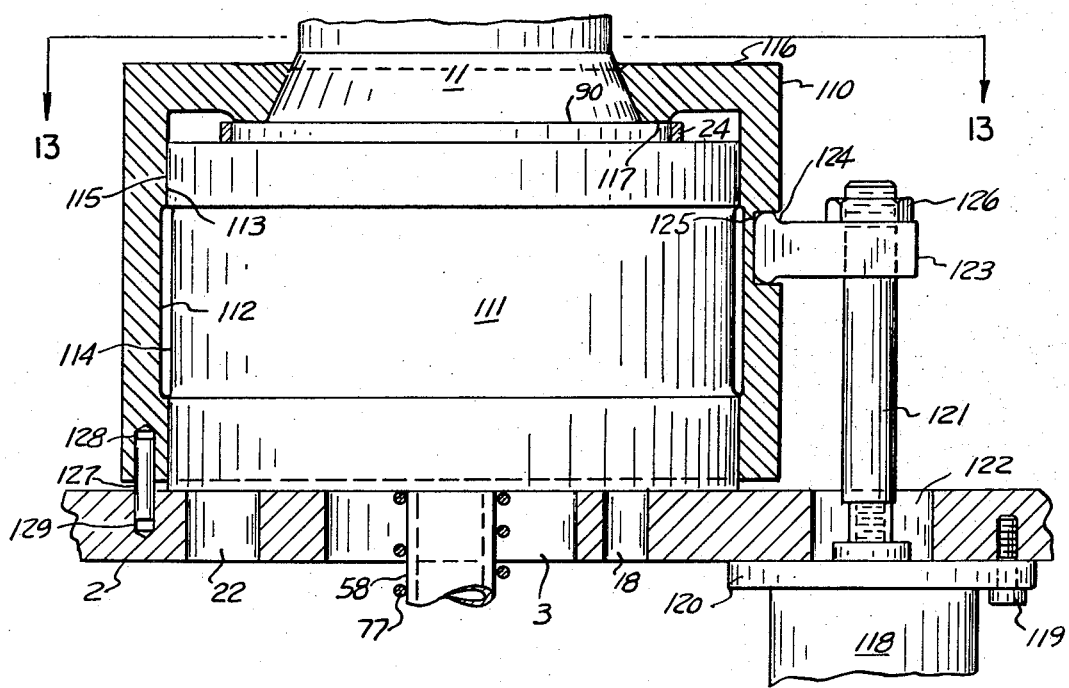

FIG. 12 is a vertical, partial, sectional view taken on line 12—12 of FIG. 13, and discloses a first modification of the annular clamp and its operating mechanism, and with the below described views is in a scale differing from the preceding views.

Figure 13:
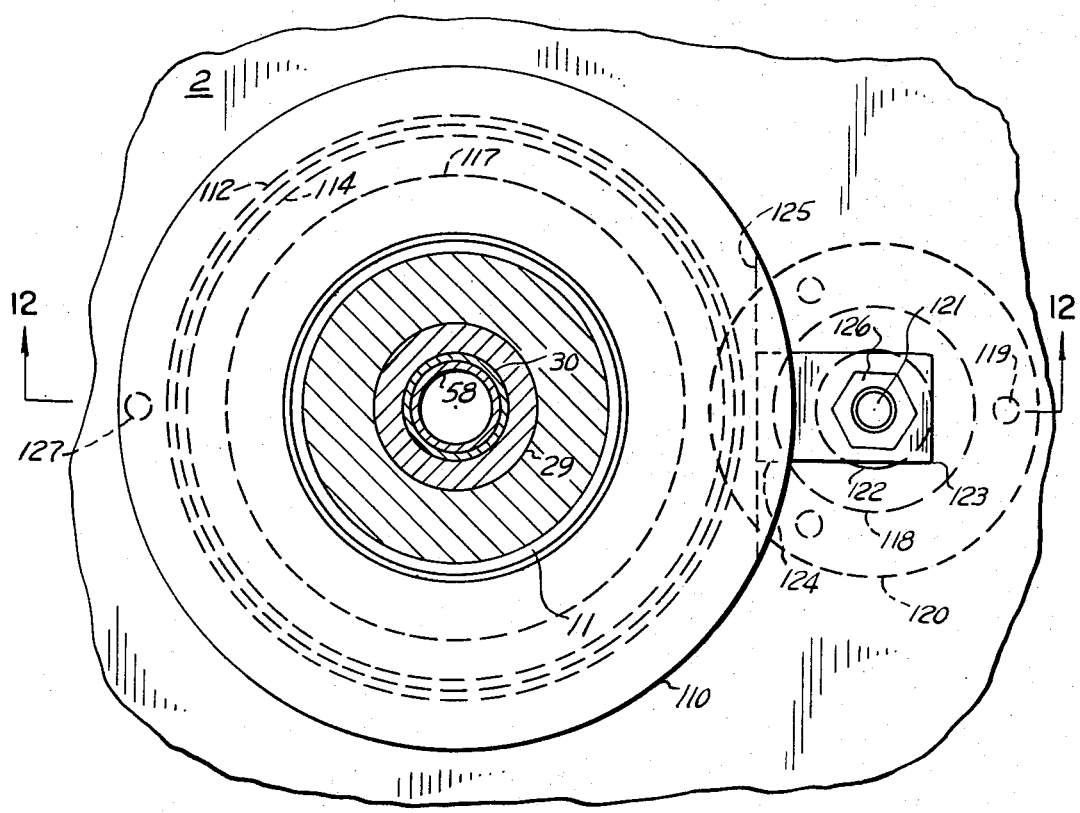

FIG. 13 is a horizontal, partial, sectional view of the first modification taken on line 13—13 of FIG. 12.

Figure 14:
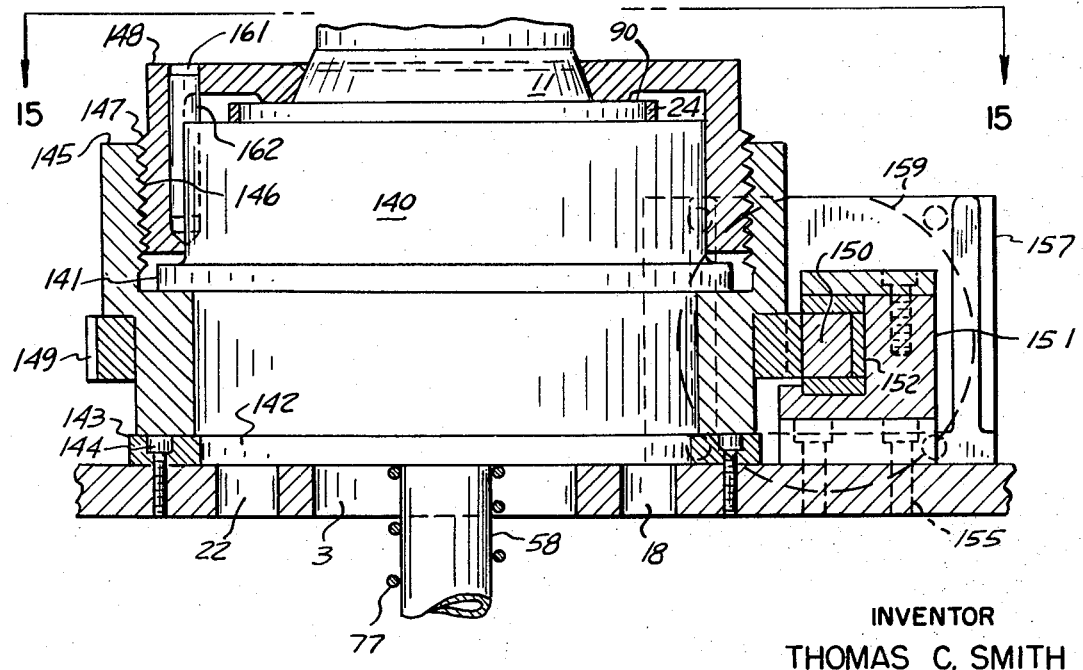
Figure 15:
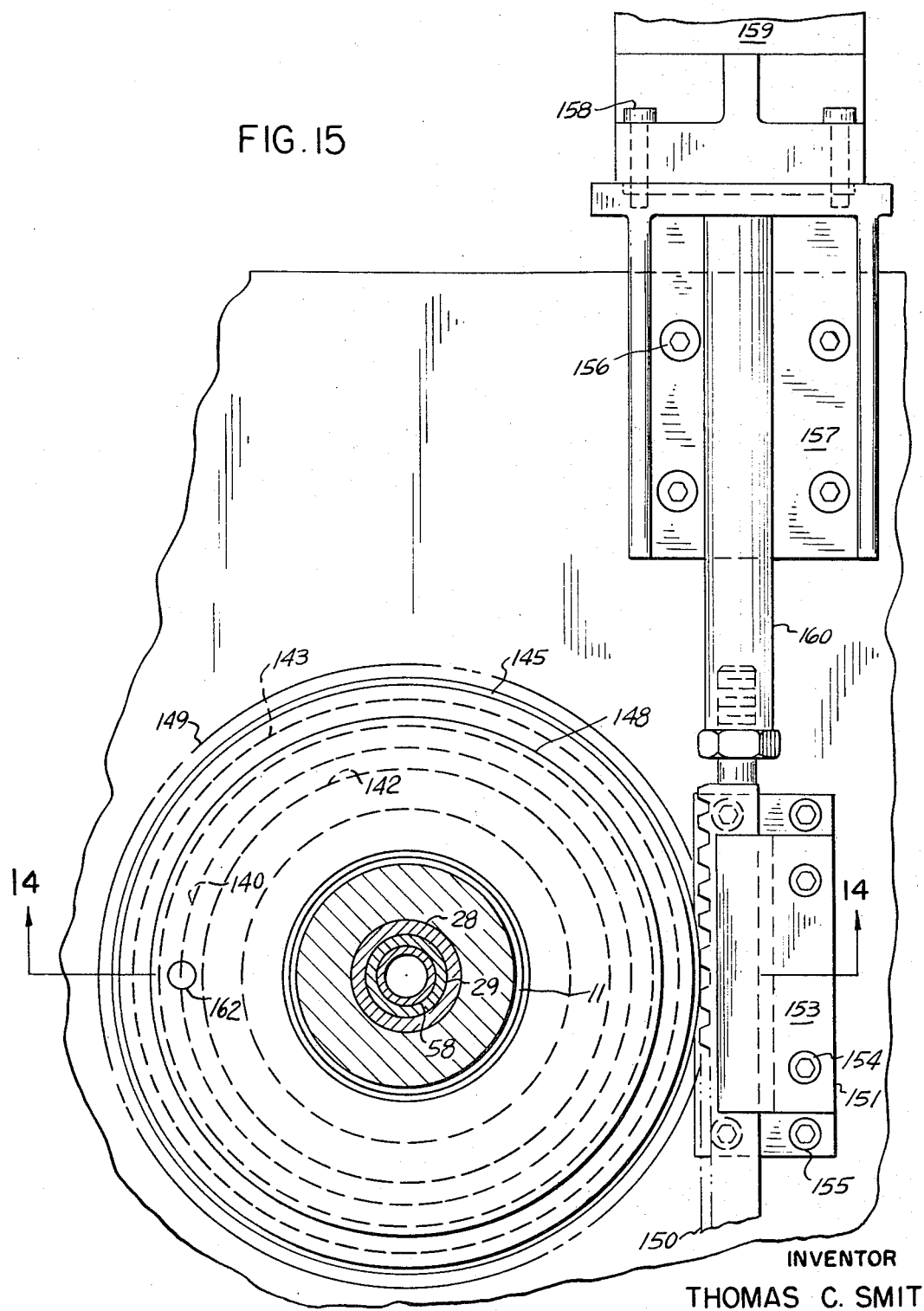

FIG. 14 is a vertical, partial, sectional view taken on line 14—14 of FIG. 15, and discloses a second modification of the annular clamp and its operating mechanism.

FIG. 15 is a horizontal, partial, sectional view taken on line 15—15 of FIG. 14.

SPHERICAL PIVOT AND OIL PROVISION

In these views the reference character 1 designates a housing having a top plate 2 in which is formed an approximately central aperture 3. An annular cylinder block 4 surmounts said plate in an encircling relationship to said aperture, and is formed with an annular flange 5 through which screws 6 rigidly secure the cylinder block in position on said top plate 2. A screw 6 and a screw 84 (hereinafter further identified) are shown approximately 10 degrees out of position in FIG. 7.

Concentrically disposed within said annular cylinder block is a pedestal 7 formed at its lower end portion with an annular flange 8 whereby screws (not shown) may secure said pedestal rigidly to the top plate 2. Surmounting an interior portion of the pedestal 7 is a seating member 9 having its upper end face spherically and concavely curved about a pivot locus 10 in the upwardly extended vertical axis common to said pedestal and seating member. Seated on and above the seating member 9 is an annular work carrier 11, having an enlarged lower portion 12 presenting to said seating member a spherically and convexly curved annular face complementary to that of the seating member. The described arrangement is such that a workpiece (such as a pneumatic tire, not shown) loaded on the carrier 11 may tilt in unison with the carrier about the locus 10 in any direction responsive to imbalance of the workpiece. Screws 13 secure the seating member in position.

To minimize friction between the spherical faces, and thus increase sensitivity of the machine, it is preferred to subject the carrier 11 to upward pressure of a fluid, preferably oil. As best shown in FIGS. 7 and 8, the seating member 9 is formed with a suitable number of vertical holes 14 which are aligned with vertical holes 14a in the pedestal 7. These holes deliver oil upwardly from an annular groove 15 in the bottom face of said seating member to its spherically formed upper face, via an annular groove 15a in said upper face. The vertical hole 14a is formed at its lower terminus with a pipe tap. A pipe (not shown) extends through hole 18 in the top plate, and is threadedly engaged in said pipe tap to deliver oil from a pump (not shown) through oil holes 14, 14a to the annular groove 15a.

The pedestal 7 and the seating member 9 are jointly formed with inner and outer, annular, open topped chambers 19 and 20 respectively. An upwardly projecting sleeve 16 forms the inner wall of the inner chamber. Screws (not shown) may extend upwardly through a flange 17 into the pedestal, to secure the sleeve in position. Said chambers receive oil draining from the pivot. One or more pipe-tapped holes 20a are provided, through which oil discharges from both said chambers through a pipe or tube (not shown) received in the tapped drain hole and extending through a hole 22 in the plate 2. Said oil descends to a reservoir to be reused in the lubricating process.

One or more passages 21 between the chambers 19 and 20 may be formed by drilling through the outer and inner walls of the pedestal 7. To avoid leakage of oil through the holes thus left in the outer wall of chamber 20, it may be desired to tap said hole to receive a threaded, fluid-sealing plug 23. An annular splash skirt 24 may be secured as by screws (not shown) threading into the enlarged lower portion 12 of the work carrier 11. It is intended that said skirt should extend downwardly sufficiently to minimize the possibility that oil might escape upwardly around it, but not so far as to interfere with the tilting travel of the carrier about the locus 10.

CHUCK ASSEMBLY AND ACTUATING MECHANISM

Disposed concentrically with the aforesaid aperture 3 is a guide block 25 bearing at its upper mid-portion an annular flange 26 whereby the guide block is rigidly secured to a chuck assembly base plate 31 by means of screws 27. Said guide block is formed with an upwardly extending collar 28 and a downwardly extending collar 29 to provide a desired extent of interior guiding surface. To resist wear, the guide block is provided with a bushing 30.

The chuck assembly base plate 31 is mounted upon the carrier 11, and has an annular portion thereof engaged between the aforesaid flange 26 and said carrier, and may be secured in position by said screws 27. Chuck jaws 32 have swinging travel upon hardened washers 33 about the axis of pivot shafts 34. A screw, 35 extends upwardly from beneath the base plate 31 to secure each shaft in position. To afford greater stability to the pivot shafts 34 and the jaws 32, it may be desirable to unite them by means of an upper plate 36 through which respective screws 37 are threaded into the upper end portions of said respective rock shafts.

As may be seen from FIGS. 4 and 5, complemented by FIG. 11, each chuck jaw is formed with a web 38 with upper and lower transversely extending flanges 39 between which flanges is received a roller 40. Each roller is rotatably mounted upon a shaft 41 which has its end portions extending upwardly and downwardly into said flanges. It may be desirable to provide a flat 42 at one of said end portions to secure said shaft against rotation by means of a set screw 43.

As clearly disclosed in FIG. 5, the web 38 terminates in a shorter, angular web 44 extending at an angle thereto and provided with an annular boss 45. Said boss secures an end member 46 of a link assembly 47, comprising a turnbuckle 48 which receives the threaded shafts 49 of upper and lower end members 46. Said end members have spherical apertures to receive, and universally swivel upon, ball members 50. Screws 51 extend through the lower ball members to secure the lower end of the link assembly to the angular web 44 at the boss 45. Lock nuts 52 are employed on each end of the turnbuckle to secure the shafts 49 against rotation. Because the link assembly moves toward and away from the vertical axis of the shaft 58 in a path of travel non-radial to said vertical axis, at least one spherical joint is needed to afford such non-radial movement.

Between the chuck assembly base plate 31 and the upper plate 36, a spider 53 is disposed for up and down travel as hereinafter described. The spider is formed with two diametrically, oppositely projecting lugs 54, which are apertured to receive bushings 55 through which the spider slides upon guide rods 56. As best seen in FIG. 2, the upper ends of the guide rods are secured beneath the upper plate 36 by means of screws 57. A spider actuating shaft 58 has its upper end portion 59 reduced in diameter and received in an aperture formed centrally in said spider. A nut 60 is threadedly received upon said upper end portion to secure the shaft and the spider in rigid assembly.

The spider is formed with peripherally spaced, radially elongated slots 61. In the upper surface of the spider, arcuately contoured grooves 62 extend transversely to, and are intersected by, said slots 61. Each groove receives a shaft 63, the central portion of which shaft extends through an upper ball member 50 upon which an upper end member 46 is universally, pivotally received.

A cover plate 64 may be secured by a plurality of screws 65 to the upper surface of said spider. Said cover plate resists escape of the shafts 63 from the respective arcuate grooves 62. Slots 66 in the cover plate are aligned with the slots 61 in the spider, to provide clearance for the upwardly protruding portions of the end members 46.

To resist rotation of the chuck assembly about the aforesaid vertical axis, a stop shaft 67 in FIG. 10 is provided. At its lower end the shaft 67 is formed with an annular flange 68 which seats upon the upper surface of a clamp 82, described in greater detail below. Screws (not shown) may extend through said flange to secure the stop shaft in position.

The stop shaft extends upwardly through an aperture 69 formed in the chuck assembly base plate 31. An elongated, hollow, receiving chamber 70, formed with an annular flange 71, is mounted upon the upper surface of said base plate 31 in a position to receive the stop shaft 67. Screws 72 may extend through said flange 71 to secure the receiving chamber in position on the base plate. The chamber consists of an annular, hollow, upwardly extending, open-mouthed tube. Received firmly in the upper end portion of said tube is a contoured plug 73, having a slot 74 extending diametrically therethrough, with the sides of said slot being arcuately contoured to engage the arcuately contoured upper end portion 75 of said stop shaft 69. It has been found that the stop shaft functions most effectively by having the locus of the radius of said arcuately contoured upper portion normally occupying the same horizontal plane as that of the locus 10 of the spherical pivot 9.

Turning now to the lower end portion of the spider actuating shaft 58, it is observed that lock nuts 76 are threadedly received on said lower end portion, and that a spring 77 reacts between said lock nuts and a washer 78 disposed beneath the lower collar 29 of the guide block 25. It is believed clear that the spring will tend to urge the lock nuts 76 and the shaft downwardly, causing the link assemblies 47 to move outwardly from said vertical axis. Each link swings its respective chuck jaw outwardly, and away from the vertical axis of the pedestal 7, to expand the chuck jaw to a workpiece gripping position.

A fluid motor 79 is disposed directly beneath the actuating shaft 58, and mounts on the upper end portion of its piston rod 80 an adapter 81 which engages beneath the lower of the two aforesaid lock nuts 76. It will be seen, that when the piston rod 80 of the fluid motor 79 is retracted, the spring is allowed its maximum play, to drive the shaft and the spider in downward travel. In actual practice, the downward extent of such travel will be limited by the inner diameter of an annular workpiece, such as a pneumatic tire, and with such a workpiece in position, the tubular actuating shaft 58 may not attain the maximum down position, such as is shown in FIG. 2.

When the chuck jaws are positioned in their contracted position for loading of a workpiece on the carrier, it is desired to restrain the annular work carrier 11 from tilting upon the spherical face of the seating member 9, to facilitate positioning of the workpiece. Said carrier is so restrained by an annular clamp, which may take the form of a hollow piston 82, encircling the pedestal 7 and the seating member 9, and being encircled in its turn by the cylinder block 4, as best seen in FIG. 7. An annular cylinder cover 83 is secured as by screws 84 (shown in FIG. 7 approximately 10 degrees out of position) upon the cylinder block 4, and has an inner, annular rib 85 extending downwardly to terminate short of an annular shoulder 86 on the annular clamp, to form an annular chamber 87. The clamp 82 has an inwardly projecting annular flange 88, which on its inner marginal portion is formed with a downwardly protruding annular lug 89. Said lug is positioned to engage with an annular shoulder 90 formed on the work carrier 11.

One or more springs 91 are received in drilled or bored holes 92 formed in the lower face of the clamp 82. Said springs urge the clamp upwardly into a carrier release position, in which normally it will not restrain the carrier from tilting travel. It may be desirable to provide a guide dowel 93 received in a bushing 94 inserted in a hole 95 provided in the lower face of the piston. The dowel also restrains the clamp from rotational travel about said vertical axis.

An inlet hole 96 in the cylinder cover is formed with a pipe tap to receive a fluid conduit for the admission of fluid under pressure into the chamber 87. Said pressure is predeterminedly sufficient to overcome the upward urging of the springs 91, and force the clamp to move downwardly, so that the downwardly protruding annular lug 89 engages upon the annular shoulder 90 to restrain the carrier 11 from tilting travel. To resist escape of the aforesaid fluid, fluid seals are provided as at 97, 98, and 99.

To measure the direction and amount of imbalance it may be desired to utilize a bubble level as shown at 1,000 which bubble level may be counted upon the upper plate 36 of the chuck assembly.

FIRST MODIFICATION

A first modification of the pivot clamping means is shown in FIGS. 12 and 13 (the scale of these views does not conform to the other views). In the modification, there is no cylinder block nor cylinder cover. The annular clamp, designated as 110 is modified, as is the exterior surface of the pedestal 111. The interior of the pedestal, the seating member and the pivot are not shown, as they may duplicate the construction hereinbefore disclosed, and illustrated in FIGS. 1 through 11. The exterior periphery of the clamp is annularly recessed as at 112, to reduce frictional engagement to annular projecting surfaces 113. The annular clamp 110, is, again, hollow and encircles the pedestal 111. The interior annular periphery of the clamp is recessed as to 114 to leave only interiorly projecting annular faces 115 slidably engaging with the surfaces 113.

Extending upwardly above the pedestal, as seen in FIG. 12, is the splash skirt 24, which corresponds o the splash skirt 24 as seen in FIG. 7(in these modifications, new reference characters are employed only on modified elements or additionally disclosed elements). Holes 18 and 22 are shown out of position in FIGS. 12 and 14. The carrier 11 is formed with an annular shoulder 90. An annular flange 116 extends inwardly of the clamp 110 and inwardly terminates in an annular, downwardly projecting lug 117, releasably engageable with said annular shoulder 90 to restrain the carrier from tilting travel.

The pedestal 111 is secured to the base plate 2 as by screws (not shown) upwardly passing through said plate into the pedestal. Beneath the plate 2 is secured a fluid motor 118, as by screws 119 passing through annular flange 120. The piston rod 121 of the fluid motor is vertically reciprocable through a hole 122 formed in the plate. Rigidly, removably secured to the upper end portion of the the piston rod is a drive lug 123. The free end portion 124 of said drive lug engages in a groove 125 formed in the wall of the clamp 110. A nut 126 may secure the drive lug in position. Upon appropriate energization of the fluid motor 118, the piston rod is impelled in reciprocable travel, and of course, by means of lug 123, 124 and groove 125, carries the clamp 110 in said travel. It will be clear, that upward travel of the piston rod will raise the clamp 110, and annular lug 123 to free the carrier 11 for tilting travel. Downward travel imposes a clamping action on said carrier to resist tilting of the carrier.

A dowel 127 is received in holes 128, and 129 in the clamp and plate respectively, to resist rotation of the clamp upon the pedestal. It is desirable that one said hole rigidly receive an end portion of said dowel and that the other said hole slidably receive the opposite end portion. A spider actuating shaft 58 is responsive to a spring 77 in the manner of the basic disclosure.

SECOND MODIFICATION

In the second modification the pedestal 140 is exteriorly modified to possess an annular flange 141, and has its lower marginal portion, reduced in diameter as at 142, received within wear ring 143, fastened by screws 144 to the base plate 2. Screws (not shown) may extend upwardly through the base plate 2 to secure the pedestal. Beneath the flange 141, the pedestal is encircled by an annular nut 145 having screw threads 146 engaged with screw threads 147 formed on annular clamp 148. The nut rigidly carries a ring gear 149, through which a drive is received from a rack 150. The rack is reciprocable in an elongated bracket 151. Wear plates 152 may be secured by screws (not shown) to the bracket, and a cover plate 153 surmounts the bracket and is secured by screws 154. Screws 155 secure the bracket to the base plate 2.

Screws 156 secure a mounting bracket 157 to the base plate 2, and screws 158 secure a fluid motor 159 to said bracket. It will now be clear that when the fluid motor 159 is energized, the piston rod 160 drives the rack in reciprocable travel, and through ring gear 149, effects reciprocable rotation of the annular nut 145. A hole 161 is drilled (FIGS. 14 and 15) at the peripheries of the annular clamp 148 and the pedestal 140, and a dowel 162 inserted therein resists relative rotational travel of the clamp upon the pedestal, about their common vertical axis. As aforesaid, the pedestal is rigidly secured, as by screws, to the base plate 2, and is unable to rotate.

As the clamp 148 cannot rotate, its reaction to rotation of the annular nut 145 and its associated screw threads 146 must be to ascend to a non-restraint position or descend to a restraint (clamping) position relative to the carrier 11. The direction of travel of the clamp responsive to extension or retraction of the piston rod, and consequent rotation of the annular nut, will, of course, depend on whether the screw threads are left or right hand.

What I claim is:
1. A balance testing machine including a workpiece clamping chuck comprising,
   a. a housing,
   b. a seating member mounted upon and upstanding from the housing, and adapted to pivotally receive,
   c. a carrier seated upon said seating member and adapted for universal, pivotal tilting travel thereon relative to a substantially vertical axis,
   d. a clamp substantially encircling said carrier and adapted for downward travel to a carrier restraining position and upward travel to a carrier release position to resist tilting of the carrier, and
   e. drive means urging the clamp in travel between said release position and said restraint position.
   f. a base member secured upon said carrier and comprising a portion of said chuck,
   g. a plurality of work clamping jaws, a respective pivot mounting each respective jaw supported by the base member for swinging travel about the axis of said pivot alternatively toward and away from said vertical axis, between workpiece load-unload position, and a workpiece gripping position for engaging upon a circumferential surface of a workpiece,
   h. a spider actuable in reciprocable up and down travel along said vertical axis, to actuate said jaws in said swinging travel,
   i. connecting links connecting said spider and jaws, to afford actuation of the jaws by travel of the spider,
   i. at least one spherical joint effecting such connection to afford non-radial movement of said links outwardly from and inwardly toward said vertical axis,
   j. a first chuck drive means urging said spider in said up travel to establish said jaws in said workpiece load-unload position, and
   k. a second chuck drive means urging said spider in down travel to establish said jaws in said gripping position.

2. A balance testing machine as set forth in claim 1, including
   1. a passage extending through the housing (a), seating member (b), carrier (c), and clamp (d), and
   m. an elongated shaft having reciprocable travel through said passage, said spider being mounted upon said shaft, and said drive means being adapted to drive said shaft to carry said spider in said reciprocable travel.

3. A balance testing machine as set forth in claim 1, wherein said clamp is formed as an annular, hollow piston,
   n. a cylinder enclosing said piston,
   o. a cylinder cover surmounting said cylinder.

4. A balance testing machine as set forth in claim 2, wherein said clamp is formed as an annular, hollow piston,
   n. a cylinder enclosing said piston,
   o. a cylinder cover surmounting said cylinder.

5. A balance testing machine as set forth in claim 1, wherein said clamp is formed as an annular sleeve, and said drive means (e) includes
   p. an actuating lug,
   r. means on said clamp to engage said lug, and
   s. means to drive said lug in reciprocable travel.

6. A balance testing machine as set forth in claim 5, wherein,
   said means on said clamp is a recess formed in the exterior face of said clamp (d), and
   said actuating lug (p) is adapted to engage in said recess.

7. A balance testing machine as set forth in claim 2, wherein said clamp is formed as an annular sleeve and said drive means (e) includes,
   p. an actuating lug,
   r. means on said clamp to engage said actuating lug, and
   s. means to drive said lug in reciprocable travel.

8. A balance testing machine as set forth in claim 7 wherein,
said means on said clamp is a recess formed in the exterior face of the clamp (d), and
said actuating lug (p) is adapted to engage in said recess.

9. A balance testing machine as set forth in claim 1, wherein said clamp is annular in form, and said drive means (e) includes,
t. an annular nut encircling said clamp,
u. screw threads formed exteriorly of said clamp, and engaged with
v. screw threads former interiorly of said nut,
w. means to apply a reciprocable rotary drive to said nut, and
x. means to resist rotation of said clamp, whereby reciprocable travel of said nut causes said clamp to respond in reciprocable travel between said restraint position and said non-restraint position.

10. A balance testing machine as set forth in claim 9 wherein said means (w) to apply a rotary drive includes,
x. a driven member rigidly carried by the nut (t),
y. a drive member disposed to engage and drive said driven member (x).

11. A balance testing machine as set forth in claim 10,
said driven member (y) being a ring gear secured to said nut (t),
said drive member (z) being a rack, having reciprocable travel, and
z. means to apply said reciprocable drive to said rack.

12. A balance testing machine as set forth in claim 2, wherein said clamp has an annular form, and said drive means (e) includes,
t. an annular nut,
u. screw threads formed exteriorly of the clamp, and engages with
v. screw threads formed interiorly of said nut,
w. means to apply reciprocable rotary drive to said nut, and
x. means to resist rotation of said clamp.

13. A balance testing machine as set forth in claim 12, wherein said means to apply a reciprocable rotary drive (w) includes,
x. a driven member rigidly carried by the nut (t),
y. a drive member disposed to engage and drive the driven member.

14. A balance testing machine as set forth in claim 13, wherein
said driven member is a ring gear secured to said nut (t),
said drive member (y) is a rack having reciprocable travel, and,
z. means to apply said drive to said rack.

* * * * *